May 13, 1941.  J. W. TEKER ET AL  2,242,195
GEARED AXLE DRIVE
Filed Aug. 31, 1940
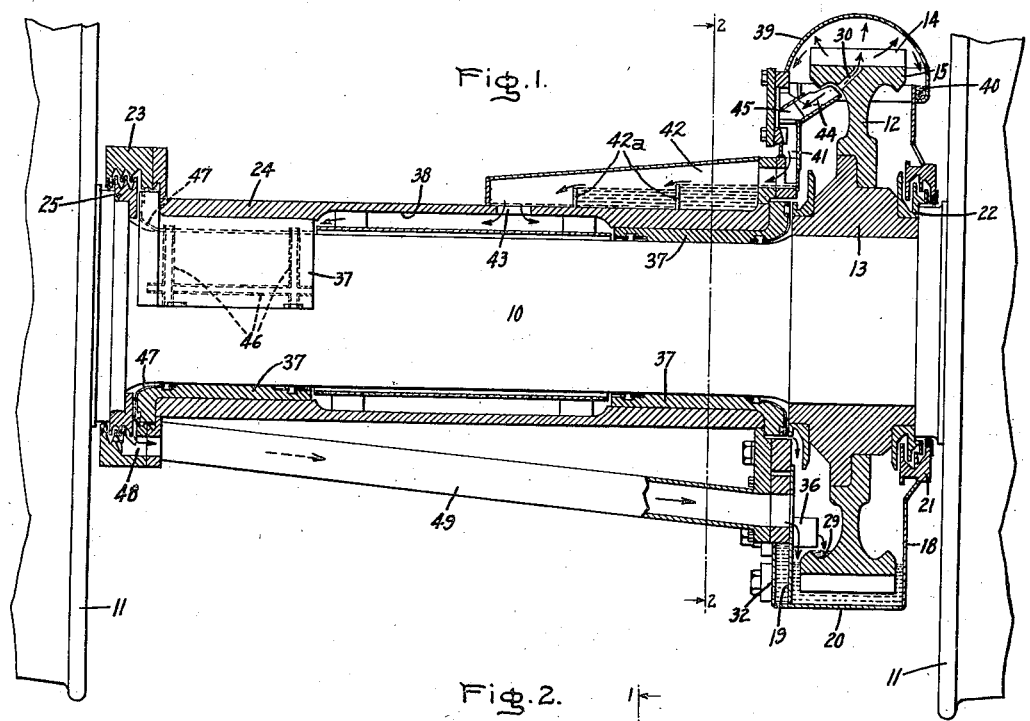
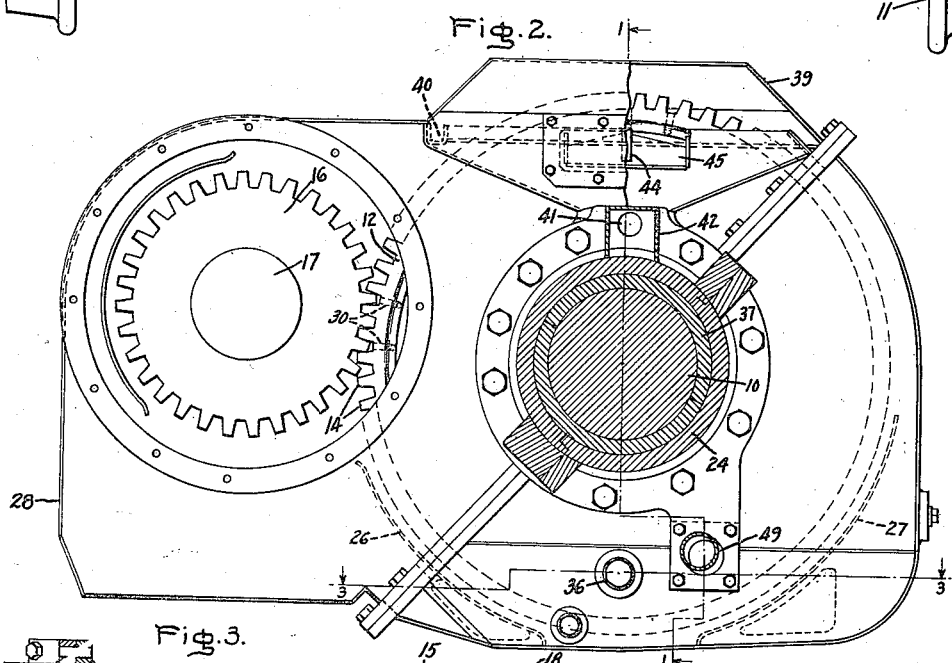
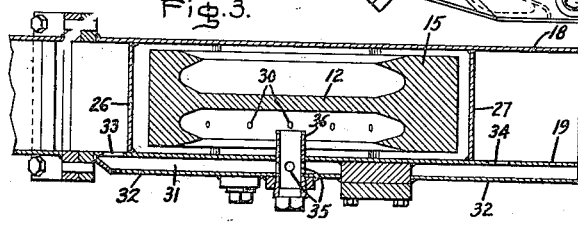
Inventors:
John W. Teker,
James C. Rhoads,
by Harry E. Dunham
Their Attorney.

Patented May 13, 1941

2,242,195

UNITED STATES PATENT OFFICE 2,242,195

GEARED AXLE DRIVE

John W. Teker, Wesleyville, and James C. Rhoads, Erie, Pa., assignors to General Electric Company, a corporation of New York Application August 31, 1940, Serial No. 355,004

6 Claims. (Cl. 184—11)

Our invention relates to geared axle drives, and particularly to an improved construction for providing efficient lubrication to the axle driving and supporting elements.

An object of our invention is to provide an improved axle driving construction provided with an efficient lubricating system.

Another object of our invention is to provide an improved lubricating system for a geared axle drive and its supporting structure.

Further objects and advantages of our invention will become apparent and our invention will be better understood from the following description referring to the accompanying drawing, and the features of novelty which characterize our invention will be pointed out with particularity in the claims annexed to and forming part of this specification.

In the drawing, Fig. 1 is a sectional side elevational view of our improved geared axle drive taken along line 1—1 Fig. 2; Fig. 2 is an end sectional view taken along line 2—2 of Fig. 1; and Fig. 3 is a partial sectional view taken along line 3—3 of Fig. 2.

Referring to the drawing, we have shown a railway vehicle driving axle 10 on which driving wheels 11 are mounted and which is adapted to be driven by an axle gear 12 operatively connected to the axle through a mounting sleeve 13. The axle gear 12 is provided with a plurality of gear teeth 14 formed on the outer periphery of a rim 15 and is adapted to be driven by a spur gear 16 which meshes with the gear teeth 14 and which is driven through a shaft 17 of an electric motor. With modern high speed drives, considerable difficulty is encountered in providing adequate and efficient lubrication to the various contacting surfaces of the gears and the bearings of this type of equipment. In the illustrated construction, a gear casing is arranged about the gears and provided with sides 18 and 19 and a bottom sheet metal member 20 arranged about the gears to provide a lubricant reservoir and to exclude dust and dirt therefrom. In order to insure against the entrance of foreign particles and to minimize the passage of lubricant out of the axle drive construction, we provide a sealing ring 21 mounted on the side of the gear casing 18 and formed as a labyrinth seal to cooperate with a complementary labyrinth sealing ring 22 mounted upon the axle 10. A corresponding labyrinth sealing ring 23 is mounted on an axle bearing housing 24 at the other end of the axle and is arranged to cooperate with a complementary labyrinth sealing ring 25 mounted on the axle 10. The axle 10 is adapted to support the gear casing and associated lubrication system through a set of split bearings including axle linings 37 arranged adjacent each end of the axle within the axle bearing housing 24. This housing is provided adjacent the central portion with a recessed portion 38 which forms a lubricant reservoir for the bearings 37 adapted to be provided with lubricant from the gear casing.

Different arrangements are provided to insure efficient and adequate lubrication to the axle bearings and the engaging surfaces of the gear teeth of the gears 12 and 16 for both directions of rotation and under varying speed conditions. Under low speed conditions, the gear teeth 14 dip into the lubricant in the gear casing reservoir and carry lubricant on their surfaces to the point of engagement with the teeth of the gear 16 so as to provide the desired lubrication thereto. Some oil is carried in the space between the teeth to their uppermost position and flows out at the open ends over the rim of the gear and falls downwardly in streams. The edge of the gear rim 15 is tapered or sharpened to facilitate the breaking away of the oil from the rim and to aid in the formation of these streams of oil. A collecting pan or pocket 45 is arranged below the rim of the gear to collect the lubricant thus raised by the gear. This lubricant is drained from the pan 45 through a passage 41 into a settling and distributing channel 42 provided with a pair of transversely extending vertical baffle walls 42a, which serve as dams over which the oil must flow. This forms settling chambers for removal of foreign substances from the oil supplied to the bearings. The distributing channel 42 communicates with the axle bearing reservoir recess 38 in the axle bearing housing 24 through an opening 43 therein. Lubricant is fed from the reservoir in the recessed portion 38 of the bearing housing to the bearings through feeding grooves 46 and 47 formed in the axle linings 37, and provides lubrication to the journal and thrust bearings of the axle. Excess lubricant drains from the outer ends of the axle linings and passes from the axle lining adjacent the gear casing through a clearance space afforded between the axle lining and the mounting sleeve 13 into the lubricant reservoir, and the excess lubricant at the other end of the axle passes through a clearance space between the axle sleeve 37 and the sealing ring 25 into a collecting pocket 48 formed in the lower portion of the sealing ring 23 and is then conducted through a tubular passageway 49 and returned to the gear casing reservoir about the gear between baffles 26 and 27 arranged closely adjacent the outer periphery of the gear teeth 14.

As the speed of the gears increases, this dip lubrication is not adequate and another arrangement is provided for supplying more lubricant to the engaging surfaces of the gears by pumping the oil from about the gear 12 to another portion of the reservoir to create a head of oil, which then is fed into an annular groove 29 formed on the inner side of the gear rim 15 from which it is supplied to the gear teeth 14 through passageways 30 arranged to extend between the groove 29 and the intertooth space of the gear 12. This system includes the pair of baffles 26 and 27 arranged about the gear teeth 14 between the gear casing walls 18 and 19, and rotation of the gear 12 in a clockwise direction, as viewed in Fig. 2, will pump lubricant from the portion of the gear casing between the baffles 26 and 27 over the baffle 26 into the adjacent portion of the gear casing between the baffle 26 and an end wall 28 of the gear casing. Rotation of the gear in the opposite direction will pump the oil over the baffle 27, so that the lubricant level in the portion of the gear casing between the baffles 26 and 27 will be considerably reduced for either direction of rotation and the lubricant level in the adjacent portion of the gear casing will be raised to provide the desired head of lubricant. The oil then is fed from the reservoir to the gear groove 29 through openings 33 and 34 in the gear casing wall 19 to a passageway 31 formed by a sheet metal enclosure 32 adjacent the side 19 of the gear casing, and then flows through openings 35 formed in a nozzle 36 secured to the passageway wall 32 and into the annular groove 29. Centrifugal force will hold the lubricant in the annular groove 29 as the gear rotates and will tend to force lubricant through the passages 30 into the intertooth space to provide lubrication thereto. At these speeds, a large portion of the lubricant will remain in the annular groove 29 as it rotates, and provision is made to feed this lubricant to the axle housing lubricant reservoir 38 to lubricate the axle bearings. A scooping finger 44 is arranged to remove this excess lubricant from the groove 29 and is secured adjacent the upper end of the gear casing in the pocket 45 and extends into the annular groove 29 closely adjacent the inner surface thereof, so as to scoop out substantially all lubricant remaining in the groove at this point. The lubricant collected by the scooping finger 44 passes into the pocket 45 from which it is drained into the passage 41 and passes to the bearing housing lubricant reservoir recess 38.

At the higher speeds of the gears, dip lubrication of the teeth is almost negligible, as relatively little oil is left in the gear casing reservoir between the baffles 26 and 27. This higher speed causes more of the oil to be forced out of the gear rim jet openings 30 from the annular groove 29, thereby adequately to maintain lubrication at the meshing of the teeth of the gears 12 and 16. This, however, reduces the amount of oil which the scooping finger 44 can feed to the axle bearings and an arrangement is provided to collect lubricant thrown out by the jet openings 30. The gear casing is provided with a sheet metal cover 39 which is formed with an inner surface extending downwardly from the center thereof towards the sides of the casing into a channel 40 extending about the upper portion of the sides and end of the gear casing. At these higher speeds of the gear 12, lubricant which is carried to the upper portion of the gear in the annular groove 29 will be forced outwardly through the jet passages 30 from which it will be thrown from the gear against the cover 39. This lubricant will drain down the sides of the cover into the passage 40 from which it will be collected and drained through the passage 41 into the distributing channel 42 and to the axle housing reservoir recess 38. During this operation the flow of oil is greater than at lower speeds, and the height of oil in the gear casing reservoir outside the baffles 26 and 27 is raised to such an extent that it requires the return passage 49 to be arranged in communication with the gear casing between the baffles 26 and 27. This allows free return of excess oil from the axle bearings and prevents backing-up of oil in the drain passage 49. This flow of lubricant is illustrated by arrows in Fig. 1 which show the operation of the lubricating system when the gear rotates at relatively high speeds. In this manner, the gears are provided with adequate and efficient lubrication for operation in either direction of rotation and under varying speed conditions and proper lubrication of the axle bearings also is provided for by the combined axle housing lubricant supply system.

While we have illustrated and described a particular embodiment of our invention, modifications thereof will occur to those skilled in the art. We desire it to be understood, therefore, that our invention is not to be limited to the particular arrangement disclosed, and we intend in the appended claims to cover all modifications which do not depart from the spirit and scope of our invention.

What we claim as new and desire to secure by Letters Patents in the United States is:

1. An axle driving construction including an axle, a gear operatively connected to said axle, an annular groove in said gear communicating with the teeth of said gear, a gear casing arranged about said gear to provide a lubricant reservoir, means cooperating with said gear on rotation thereof for pumping lubricant from a portion of said casing about said gear into an adjacent portion of said casing, means for returning lubricant from said adjacent casing portion into said annular groove in said gear, a bearing for said axle, means for collecting excess lubricant from said gear, means including a settling channel for conducting the collected lubricant to said bearing, and means for collecting excess lubricant from said bearing and returning the collected excess lubricant to said gear casing.

2. An axle driving construction including an axle, a gear operatively connected to said axle, a gear casing arranged about said gear to provide a lubricant reservoir, means including a cover for said gear casing provided with a collecting channel and a surface for draining into said channel lubricant thrown from said gear, a bearing for said axle, a bearing housing about said bearing constructed to provide a lubricant reservoir communicating with the bearing surface between said bearing and said axle, means including a settling channel for collecting lubricant from said gear casing channel and conducting the collected lubricant to said bearing housing reservoir, and means for collecting excess lubricant from said bearing and returning the collected excess lubricant to said gear casing.

3. An axle driving construction including an axle, a gear operatively connected to said axle, said gear being provided with a rim having external gear teeth and an annular groove on the inner side of said rim, a gear casing arranged about said gear to provide a lubricant reservoir, means cooperating with said gear on rotation thereof for pumping lubricant from a portion of said casing about said gear into an adjacent portion of said casing, means for returning lubricant from said adjacent casing portion into said annular groove in said gear, means including a passage extending outwardly from said gear groove to the intertooth space of said gear for supplying lubricant thereto, a bearing for said axle, means for collecting lubricant thereon from said gear and conducting the collected lubricant to said bearing, and means for collecting excess lubricant from said bearing and returning the collected excess lubricant to said gear casing.

4. An axle driving construction including an axle, a gear operatively connected to said axle, said gear being provided with a rim having external gear teeth and an annular groove on the inner side of said rim, a gear casing arranged about said gear to provide a lubricant reservoir, a bearing for said axle, a bearing housing about said bearing constructed to provide a lubricant reservoir communicating with the bearing surface between said bearing and said axle, means including a cover for said gear casing provided with a collecting channel and a surface for draining into said channel lubricant thrown from said gear, a scooping finger arranged adjacent the upper end of said gear casing for removing substantially all excess lubricant remaining in said gear groove, means for collecting lubricant from said gear casing cover channel and from said scooping finger and for conducting the collected lubricant to said bearing housing reservoir, and means for collecting excess lubricant from said bearing and returning the collected excess lubricant to said gear casing.

5. An axle driving construction including an axle, a gear operatively connected to said axle, said gear being provided with a rim having external gear teeth and an annular groove on the inner side of said rim, a gear casing arranged about said gear to provide a lubricant reservoir, means including a baffle within said casing arranged adjacent the outer periphery of the lower portion of said gear and extending to the sides of said casing for cooperating with said gear on rotation thereof to pump lubricant from said casing portion within said baffle into the adjacent portion of said casing, means including a return passageway provided with a nozzle for returning lubricant from said adjacent casing portion into said annular groove of said gear, means including a passage extending outwardly from said annular groove to the intertooth space of said gear for supplying lubricant from said groove to said teeth, means including a cover for said gear casing provided with a collecting channel and a surface for draining into said channel lubricant thrown from said gear, a bearing arranged adjacent each end of said axle, a bearing housing about said bearings arranged to support said gear casing thereon, said bearing housing being constructed to provide a lubricant reservoir communicating with the bearing surfaces between said bearings and said axle, means including a scooping finger arranged adjacent the upper end of said gear casing and extending into said annular groove in said gear for removing substantially all lubricant remaining therein, means for collecting lubricant from said gear casing cover channel and from said scooping finger and conducting the collected lubricant to said bearing housing lubricant reservoir, and means for collecting excess lubricant from the ends of said bearing away from said bearing housing lubricant reservoir and returning the excess lubricant to said gear casing.

6. An axle driving construction including an axle, a gear operatively connected to said axle, said gear being provided with a rim having external gear teeth and an annular groove on the inner side of said rim, a gear casing arranged about said gear to provide a lubricant reservoir, means cooperating with said gear on rotation thereof for pumping lubricant from a portion of said casing about said gear into an adjacent portion of said casing, means for returning lubricant from said adjacent casing portion into said groove in said gear, means including a passage extending outwardly from said gear groove to the intertooth space of said gear for supplying lubricant thereto, means including a cover for said gear casing provided with a surface for draining and collecting lubricant thrown from said gear, a bearing for said axle, a bearing housing about said bearing constructed to provide a lubricant reservoir communicating with the bearing surface between said bearing and said axle, means for collecting lubricant from said gear casing cover and conducting the collected lubricant to said bearing housing lubricant reservoir, and means for collecting excess lubricant from said bearing and returning the excess lubricant to said gear casing.

JOHN W. TEKER.
JAMES C. RHOADS.